United States Patent [19]

Viazanko

[11] Patent Number: 4,987,813
[45] Date of Patent: Jan. 29, 1991

[54] APPARATUS FOR INSTALLATION OF A POWER SAW AND FENCE IN A TABLE

[76] Inventor: John P. Viazanko, 15034 Chase St., Sepulveda, Calif. 91343

[21] Appl. No.: 462,597

[22] Filed: Jan. 9, 1990

[51] Int. Cl.⁵ .......................... B27B 15/18; B27C 9/00
[52] U.S. Cl. ................ 83/471.3; 144/286 R; 144/286 A
[58] Field of Search ............. 83/471.3, 574; 144/286 R, 286 A, 287, 1 R

[56] References Cited

U.S. PATENT DOCUMENTS

| | | | |
|---|---|---|---|
| 4,335,765 | 6/1982 | Murphy | 83/574 |
| 4,693,158 | 9/1987 | Price | 144/287 |
| 4,694,720 | 9/1987 | Brickner et al. | 144/286 R |
| 4,798,113 | 1/1989 | Viazanko | 144/286 R |
| 4,860,807 | 8/1989 | Vacchiano | 144/286 R |

*Primary Examiner*—W. Donald Bray
*Attorney, Agent, or Firm*—Hadd S. Lane

[57] ABSTRACT

A commercially obtainable miter or radial saw having a planar work support is mounted in a cut-out made in the top of a conventional shop bench or table by a saw support, which when attached to the table top and adjusted, will bring the top of the saw work support into alignment with the top of the table to form a continuous surface. A fence carrying an adjustable work stop and a scale may be mounted on either or both sides of the saw so as to be continuous with the fence originally, or otherwise, supplied with the saw.

23 Claims, 3 Drawing Sheets

APPARATUS FOR INSTALLATION OF A POWER SAW AND FENCE IN A TABLE

FIELD OF THE INVENTION

This invention is to a support which will mount a commercially purchasable power miter saw or radial arm saw in a cut-out made in a shop table or bench, so that when using the adjustable securing means, the relatively small, horizontal work surface of the saw is rigidly and permanently flush with the larger work surface of the table. A fence on either or both sides of the saw may also be securely mounted on the table work surface so as to be in permanent alignment with the original fence of the saw. A scale and an adjustable stop will permit positioning the work for proper length and angle of cut.

BACKGROUND OF THE INVENTION

Miter saws are used extensively in all fields of carpentry, particularly in finish carpentry. When finish coping baseboard and other trim strips are applied in a cabinet shop, they must be cut accurately to length and to the correct angle to join the adjacent trim. The motor-driven miter saw has been particularly developed for this use. Such miter saw has a horizontal table which carries a fence thereon. A rotary blade saw is pivoted to swing about a vertical swing axis and is locked at the desired angle with respect to the fence. The rotating blade can also be swung down at least partially into a slot in the table, to perform the cutting.

In each saw on the market, the horizontal table of the saw, depending on the manufacturer, varies from that of the others in respect to the height of the saw table above its support. Where the material cut is of a long length, the difference in height between the saw table and the bench top will lead to inaccurate cuts, and must be fixtured to support it at the saw table. This is time consuming and dangerous, since temporary fixtures tend to be unstable.

To meet this problem, the present invention provides an adjustable saw support, which when mounted in a proper location in a shop bench or table, will position virtually any saw table so that it is flush, or co-planar, with the shop table, regardless of the dimensions of the saw support provided by the saw manufacturer. With this achieved, long pieces of material may be fully supported by the saw table and the shop bench, and long pieces of work may be moved longitudinally for proper cutting.

The length of the back fence of such saws is relatively short leading to inaccurate cuts. A longer fence comprising a temporary wooden fixture to guide the material does not generally properly position the work, and also no accurate way to measure the length of the work being cut without a tape measure and pencil is provided. The use of a tape measure and pencil is inconvenient, inaccurate in itself, and dangerous, since the blade guard must be removed to enable the operator to locate the pencil mark in relation to the blade used for the cut. This invention also provides a permanently mounted fence which houses a measuring scale and a measuring work stop parallel to the original fence of the saw. The stop is positioned by reference to the scale, eliminating the pencil and hand ruler, and can be locked in place for repetitive cuts, the blade guard remaining in place to provide maximum safety for everyone in the saw's vicinity.

The functions of a saw mounted in accord with this invention are similar to those disclosed in my former U.S. Pat. No. 4,798.113. The difference is that, in the present case, a heavy and strong shop bench is used as a permanent support for the saw and fences, while in the former case a lighter portable and temporary support is used.

SHORT DESCRIPTION OF THE DRAWINGS

Figure 1:
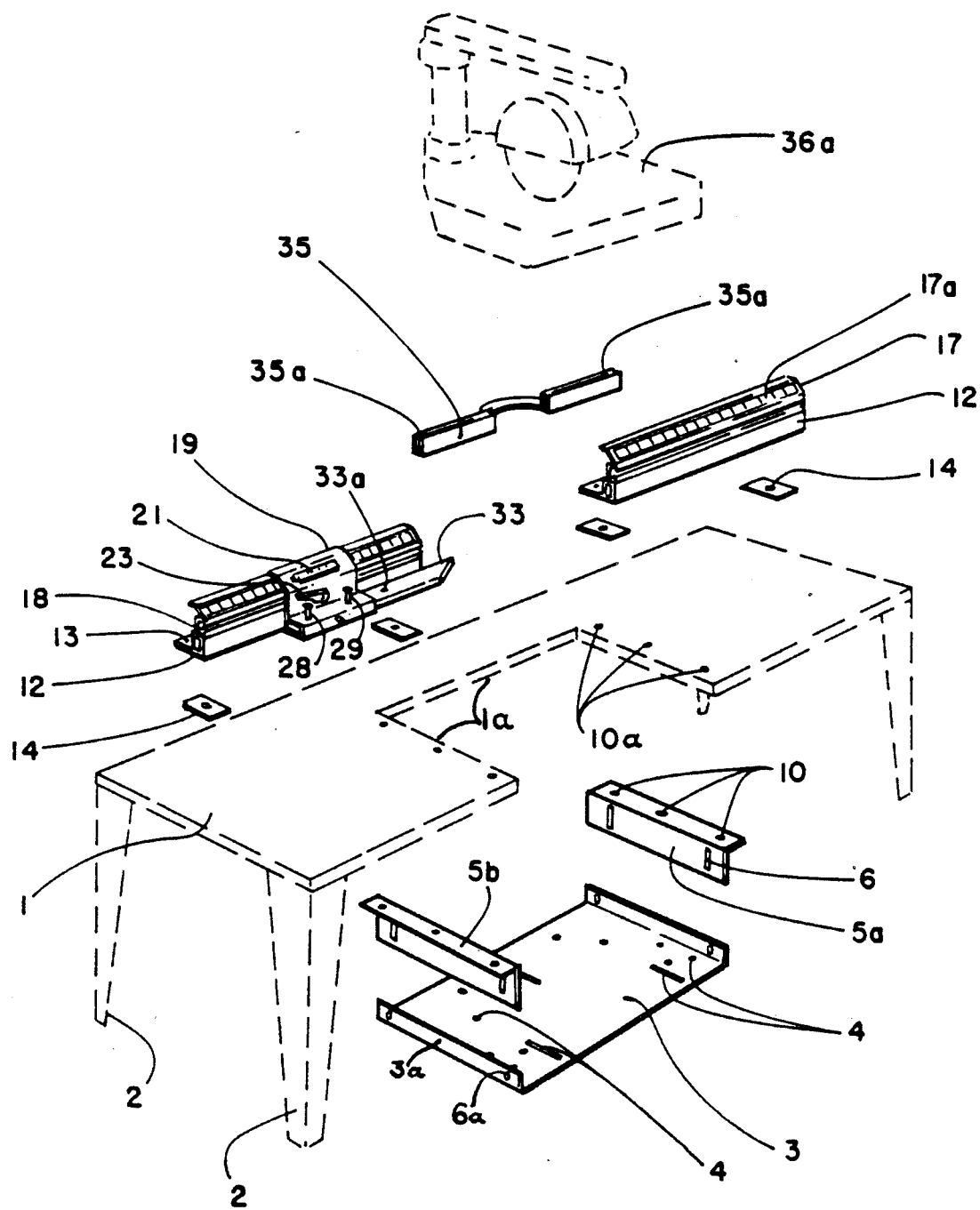
FIG. 1 is a disassembled view of the saw support and extension table of this invention; the saw and the shop bench shown in phantom.

In detail, FIG. 1 shows a shop table or bench with work surface 1. This table is to be strong, heavy and preferably secured to the floor in a permanent manner, by legs 2. The work top or surface 1 has a cut-out or space 1a which, as shown, is preferably in in the center and opening to the front of top 1, thus leaving side and connecting areas or portions, shown. However, other locations are possible, and the table may be re-enforced at the opening, if desired.

The saw support 3 (all FIGS.) holds the saw by direct bolting to this support, using bolts which pass through the holes or slots and the holes normally found in the base of saws as furnished by the trade. The holes & slots 4 are chosen to fit the bolt pattern of such saws so that four bolts are used and the other holes (usable for other saws) will be left blank. In some cases, the user will find it expedient to drill other holes for a perfect fit and securement.

Figure 3:
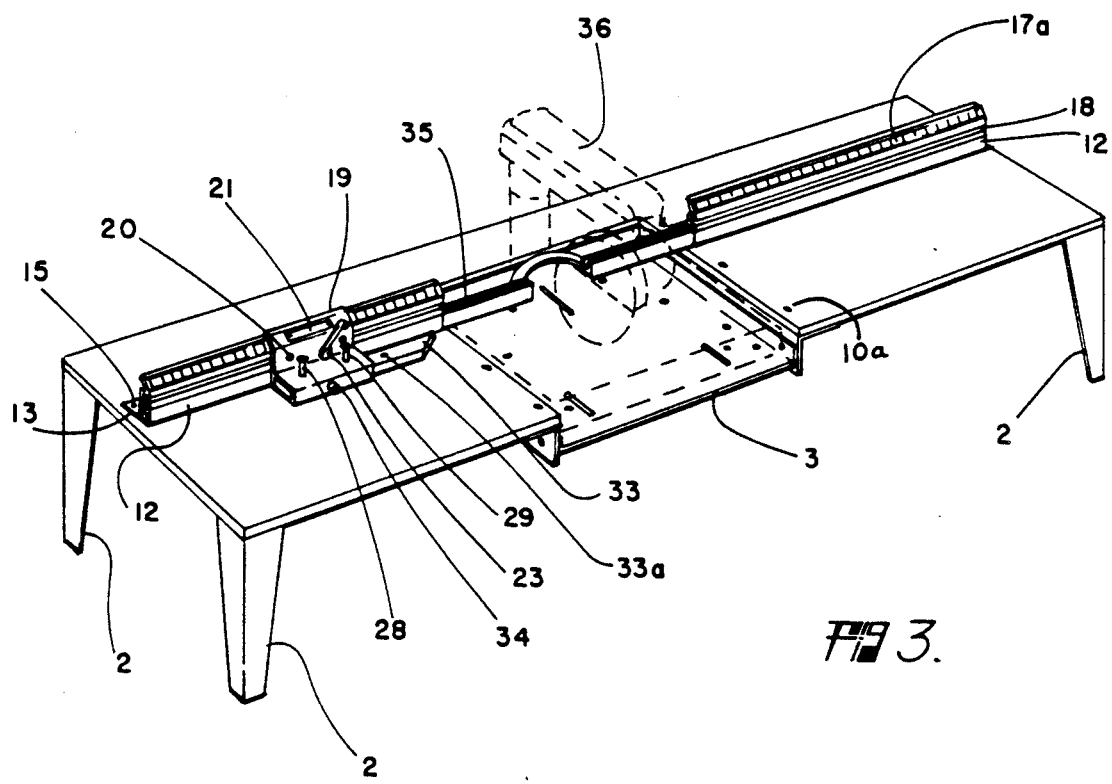
FIG. 3 is an assembled isometric view of the fences, the shop bench, the saw support or mounting tray and, in phantom, the saw.
Figure 4:
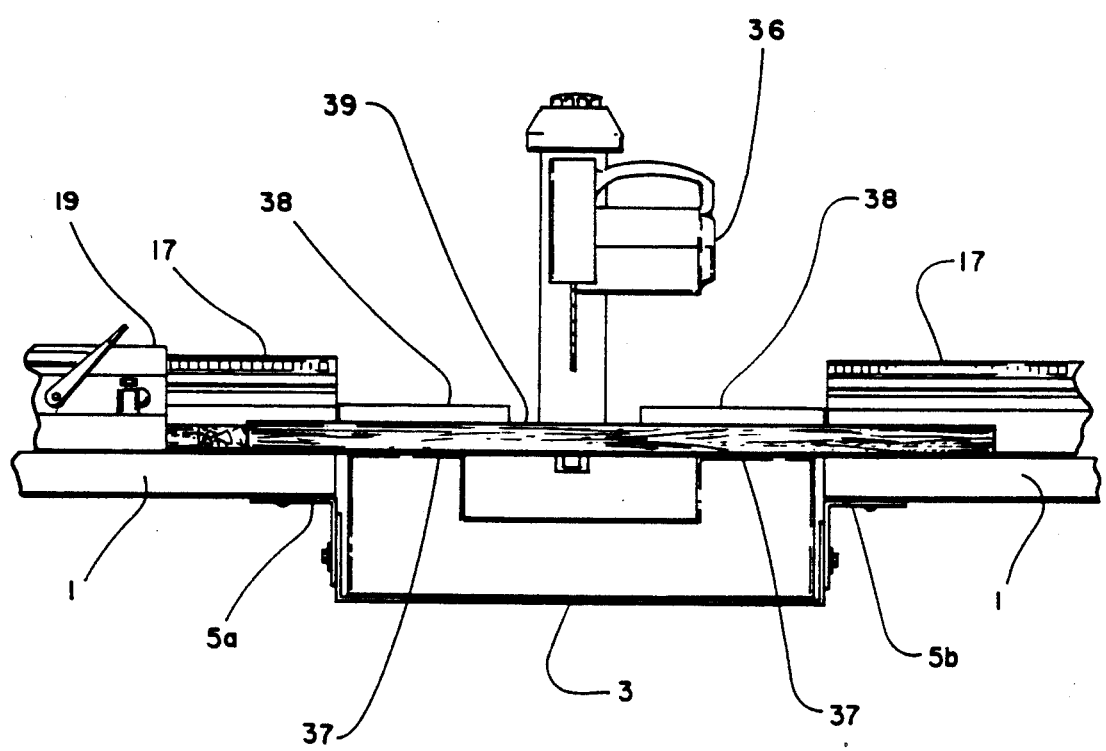
FIG. 4 is a side elevation of the saw, the fences 9in part), the saw support and the bench (in part).

The support 3 is secured to the table top by means of right and left brackets 5a and 5b. These brackets are secured to the right an left lower margins of the cut-out 1a by means of bolts which pass through holes 10a in the table and 10 in each bracket. The width of the cut-out is such that when the brackets are secured flush with opening 1a, the flanges 3a of the support 3 snugly fit therebetween as shown in FIGS. 3 & 4. The bolts passing through holes 10 and 10a are preferably flat headed, the holes 10a being countersunk so that the upper surface of the table 1 is smooth.

Brackets 5a–5b have bolt slots 6 in their vertical sides, as shown in FIG. 1. Shallow headed bolts pass through holes 6a in flanges 3a and through slots 6 to a washer and nut.

The saw 36 is now placed on the support 3 and bolts are passed through the bolt holes found in the base of commercial saws and through the proper holes or slots 4 of the support 3. The dimensions of the support are such that when this is done, the horizontal work support 37 of the saw fits snugly into the table cut-out 1a. The support 3 is then raised or lowered as is permitted by the slots 6, until the work surface 37 of the saw is flush with the top surface of the table 1, and the bolts passing through holes 6a and slots 6 are permanently tightened. The table top 1 and saw work surface 37 then present a single, unbroken, planar surface to hold long lengths of material 39 for cutting.

The fences are made of extensions 12, and include extensions 13 and a plurality of holes 15 therethrough. Bolts 16 pass through these holes and through properly positioned holes in the table top 1 so that the extrusion fences 12 abut and align with the fence 35 of the saw when secured to the table 1 as mentioned above.

The fences further include index rails 17, each of which has a longitudinal recess to receive full length measuring scale 17a at a convenient angle for operator vision. Lateral slot 18 extends the full length of each fence, and receives guide pins 20 for sliding motion in the slot. These pins may be round, or with a flat bottom area, and may be coated with mylar or teflon (5 mils) for smooth movement with no metal to metal contact.

Length measuring gage and work stop assembly 19 is secured to and supported by two guide pins 10 for movement along the length of the fence. The gage 19 also includes an indexing window 10, which has a witness line to read the position of the gage on the fence. This window and line is mounted by screws 22 passing through slots in the window, to permit lateral adjustment for blade kerf width.

Figure 2:
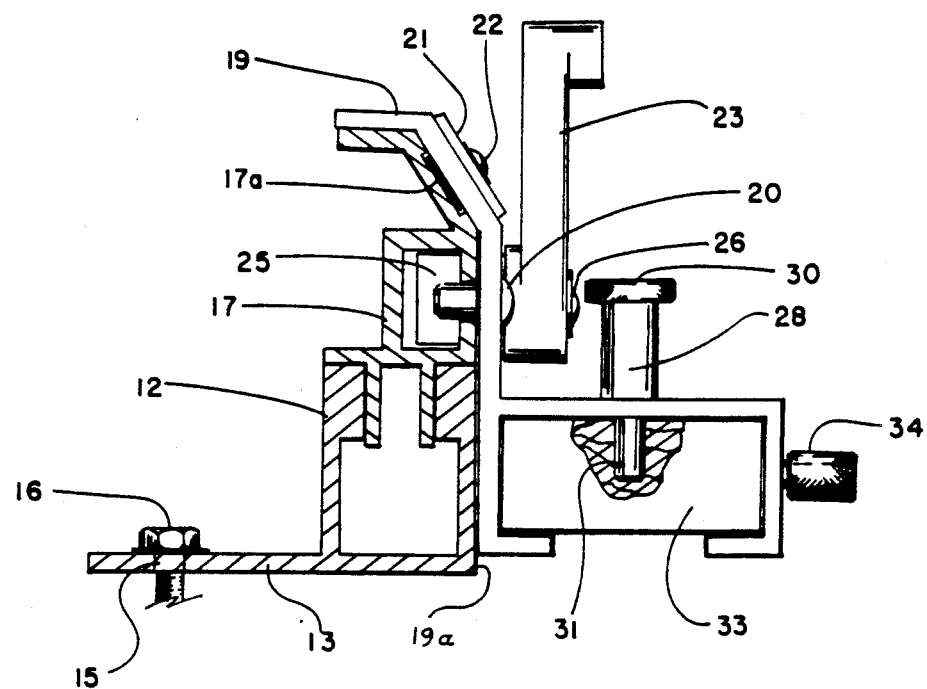
FIG. 2 is an assembled cross-section of a fence extension, and a stop shown in elevation.

Locking lever 23 is secured to screw 26 to be movable therewith. This screw passes from the lever through the slot 18 and is threaded into locking block 25 which slides in the recess behind the slot 18 in the extrusion, as shown in FIG. 2. When lever 23 is rotated with screw 26, the screw tightens block 25 and the gage itself against the fence to hold the gage in measured position, or to release for movement when the screw releases the block and gage.

The gage and work stop also includes spring-loaded locating pin 28, which has a finger grip lifter 30 and a reduced portion 31 which is fitted in a corresponding hole in work stop 33. After so locating the stop 33 in its slot in the gage 19, the stop may be further held against motion by thumb pressure screw 34.

FIGS. 1 and 3 show a second locating pin 29, which enters hole 33a of the stop. Pin 29 is for left of blade cutting, as shown in FIG. 3. The block 33 may have a beveled face to abut the bevel of a previously cut piece of work, as shown in FIG. 3. Pin 28, entering the same hole in block 33, would be used for right of blade cutting.

Saw 36 may be originally equipped, or specially supplied, with short fence 35, which has a relief curve for the saw blade when lowered to cutting position. This fence should be installed on the saw as directed by the saw manufacturer. The fences of this application should then be installed so that they abut and are in alignment with the original fence so as to form a continuous, elongated fence on each side. Any length of fence is possible, but there are practical limits Certain modifications suggest themselves. Thus the index rail 17 could be integral with extrusion 12, instead of being separate, as shown in FIG. 2. Also, the horizontal position of support 3 could be made in two overlapping parts joined by bolts passing through holes and slots so as to be adjustable for larger or smaller saws.

Since the saw and its fence are rigidly held in position on the table 1, and the fences of the invention are rigidly attached to the table, the fences may abut and provide a smooth surface with nothing further. However, an adaptor may be provided which, on one end, will fit the original fence {38} and also, on the other end, will fit into the recesses or the fence 35 herein described. This will make the transition between the fences even more secure and reliable, and permit the stop to move closer to the blade.

Dust relief blocks 14 may be provided between the extensions 13 and the table 1. They are wide enough to provide complete stability of the fence when bolts 16 pass through their centering holes and are tightened. This leaves a small space between the fence 12-13 and the table, for the passage of sawdust from the face of the fence. Otherwise this dust could interfere with the accuracy of the placement of the work, and hence the accuracy of the cut.

In use, the complete apparatus is assembled and the saw 36 swung to the desired bevel angle (i.e. 45°). The gage is assembled on the left as in FIG. 3, and the block 33 has a 45° angle. The gage is then moved so that the angled portion of stop 33 touches the saw blade. The index window and the witness line is then set to zero. When the gage is moved to the left, and material 39 abuts stop 33, the scale will indicate the length of the material after cutting.

The gage member accepts interchangeable stops 33, and can be replaced on account of wear, or of a differing stop face angle. Each of the stop faces is organized so that the position at which it stops the wood against an angular, or square, stop face is correct with respect to the reading on index scale 17a.

It is obvious that the fence of this invention can be used with a power miter (or "chop") saw, a radial arm saw, or a conventional cut-off saw.

I claim:

1. Apparatus for installing a power saw having a base and a work support with a horizontal upper surface in a table having a top with a continuous upper working surface, and a cut-out to receive said work support, said cut-out leaving said top with portions at each side and a connecting portion therebetween, comprising mounting means attached to said top to support said base, the dimensions and placement of said means being such that the saw work support is held within said cut-out, and the upper surface of said saw work support and the upper surface of said table are substantially co-planar to present a composite work supporting surface for said saw, comprising both of said first named surfaces, said top being of sufficient strength and rigidity to support said saw and the work being sawed under normal conditions.

2. The apparatus of claim 1 wherein the said mounting means is adjustable, to support any saw within a range of sizes.

3. The apparatus of claim 2 wherein the mounting means is attached to said table at the margins of said cut-out.

4. The apparatus of claim 3 wherein said mounting means is vertically adjustable to support any saw within a range of height sizes.

5. The apparatus of claim 3 wherein the said mounting means comprises brackets secured to underside of said table top, a mounting plate to hold said base, and means to connect said brackets and plate.

6. The apparatus of claim 5 wherein said means to connect is adjustable.

7. The apparatus of claim 5 wherein said brackets are secured to said top by means of screws passing vertically through said brackets and top.

8. The apparatus of claim 1 wherein the size and shape of the cut-out is substantially the same size and shape of the saw work support, wherein the said composite work supporting surface is substantially continuous.

9. The apparatus of claim 1 wherein there is a fence for said saw attached to said table positioned to guide material to be cut, to the blade of said saw.

10. The apparatus of claim 9 wherein said power saw is equipped with its own relatively short fence, and the fence attached to said table is aligned with the said short fence to create a composite, relatively long fence.

11. The apparatus of claim 10 wherein said fences abut, to create a continuous fence.

12. The apparatus of claim 9 wherein there is a scale holder and scale on said fence, and a movable stop mounted on said scale holder, the positioning of said stop, saw and scale being such that the length of the material to be cut by the saw is indicated.

13. The apparatus of claim 12 wherein the said stop includes an angled surface to contact an angled surface of a previously cut piece of material.

14. The apparatus of claim 12 wherein said stop includes a removably secured block to contact the materials which can be interchanged with other blocks of differing shapes and dimensions, whereby the length of a piece of material of a given configuration to be cut will be indicated when a block corresponding to said configuration is secured to said stop.

15. The apparatus of claim 12 wherein said scale includes an adjustably mounted witness line, whereby the length indication can be accurately adjusted to the length of the cut material.

16. The apparatus of claim 14 wherein said scale includes an adjustably mounted witness line, whereby the length indication can be accurately adjusted.

17. The apparatus of claim 12 wherein said fence includes a longitudinal recess and a longitudinal slot between said recess and the face of the fence, and stop supporting elements passing from said stop into said recess for sliding adjustment motion.

18. The apparatus of claim 17 wherein there is a securing block slideable in said recess and attached to said stop by means passing through said slot, and further means to tighten or release the first means to restrain or permit sliding motion of said stop.

19. The apparatus of claim 9 wherein the said fence is attached to said table by a rearward extension at the bottom of said fence, spaced apertures in said extension, elongated securing means passing through said apertures and table, to secure the fence to the table, and spacers between said fence and the table to provide a channel for the escape of sawdust adjacent the fence.

20. An elongated fence for use with a woodworking tool requiring a fence, said fence including a front abutment face and a scale, a stop having means to permit sliding to an adjusted position along said fence and further means to secure the stop at that position, said means to permit motion including a deeper elongated recess behind the front face of the fence, a more shallow slot between said recess and the face, guiding and supporting elements secured to said stop and extending into said slot, a sliding block in said recess, and a further tightenable and releaseable element extending between said stop and said sliding block to permit or restrain motion, said scale indicating the position of said stop.

21. The Apparatus of claim 17 wherein said stop supporting elements have an outer surface of low friction plastic to prevent metal to metal contact and to achieve smooth lateral movement.

22. The Apparatus of claim 17 wherein said stop has a rear surface of low friction plastic to provide smooth lateral motion with no metal to metal contact.

23. The Apparatus of claim 9 wherein said fence is installed to provide a relatively short running clearance with the blade of said saw, thereby eliminating any standard fence supplied by the manufacturer.

* * * * *